United States Patent [19]

Robertsson

[11] 4,007,991
[45] Feb. 15, 1977

[54] SYSTEM FOR TRANSMITTING POSITION INFORMATION

[75] Inventor: Hans R. Robertsson, Molndal, Sweden

[73] Assignee: Saab-Scania Aktiebolag, Linkoping, Sweden

[22] Filed: Dec. 3, 1975

[21] Appl. No.: 637,107

Related U.S. Application Data

[63] Continuation of Ser. No. 484,958, July 1, 1974, abandoned.

[30] Foreign Application Priority Data

July 2, 1973 Sweden .......................... 7309268

[52] U.S. Cl. .............................. 356/141; 250/199; 340/27 NA; 343/102; 356/152
[51] Int. Cl.² ...................... G01B 11/26; B22D 7/10
[58] Field of Search .......................... 356/141, 152; 343/106 R, 102; 250/199; 340/27 NA

[56] References Cited

UNITED STATES PATENTS

| | | | |
|---|---|---|---|
| 3,089,138 | 5/1963 | Battle, Jr. ................ | 343/106 R |
| 3,484,167 | 12/1969 | Burns, Jr. ................ | 356/5 |
| 3,882,482 | 9/1969 | Green et al. .............. | 340/347 P |

Primary Examiner—Maynard R. Wilbur
Assistant Examiner—S. C. Buczinski
Attorney, Agent, or Firm—Ira Milton Jones & Associates

[57] ABSTRACT

Various items of information are transmitted to a body moving above the surface by a pulsed fan-shaped beam of radiant energy having a flatwise angular sweep. Each such item can comprise two or more kinds of data, e.g., beam angle data and beam identification data. To each different item to be transmitted is assigned a unique whole number. Every interval between successive beam pulses has a duration equal to a non-characterizing time period of invariant duration plus a stepwise variable characterizing time period measurable in a whole number of short, uniform time units. The number of such time units in the characterizing time period of an interval corresponds to the number assigned to an item of information to be transmitted during that interval. At the body, clock pulses are generated at a steady rate such that a whole number thereof are issued per time unit, and are counted during the characterizing period of each interval, for decoding the then-transmitted item of information.

3 Claims, 7 Drawing Figures

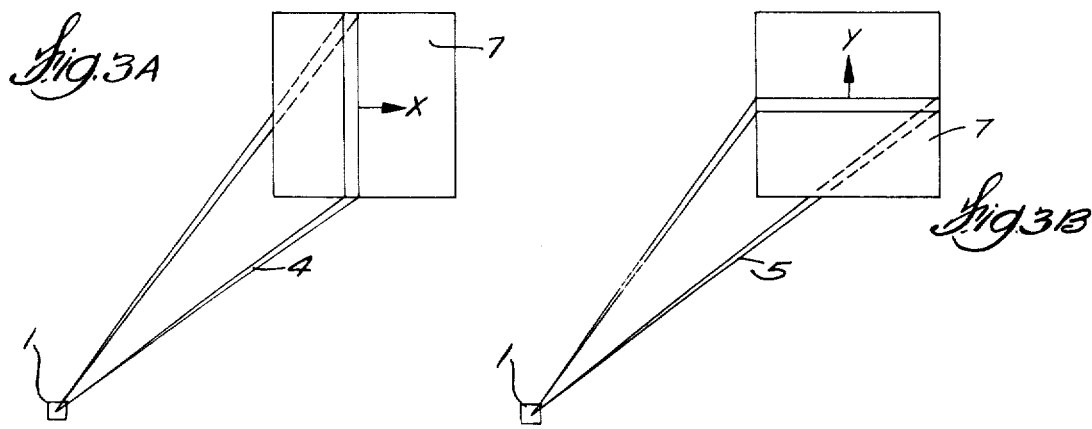
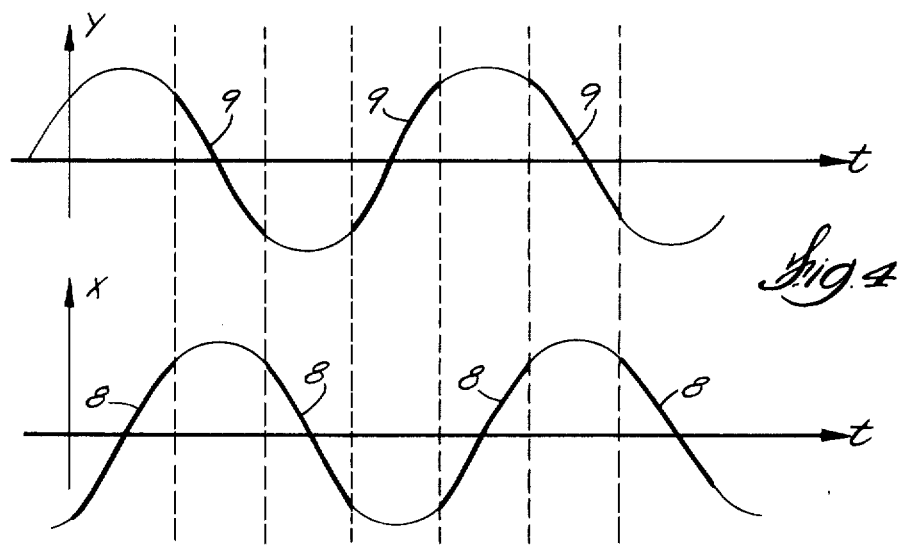
| | | | | | | | | | |
|---|---|---|---|---|---|---|---|---|---|
| X | X | X | X | X | X | 1 | 0 | 0 | POSITION INFO.- POS. X-DIRECTION |
| X | X | X | X | X | X | 0 | 0 | 0 | POSITION INFO.- NEG. X-DIRECTION |
| X | X | X | X | X | X | 1 | 1 | 0 | POSITION INFO.- POS. Y-DIRECTION |
| X | X | X | X | X | X | 0 | 1 | 0 | POSITION INFO.- NEG. Y-DIRECTION |
| X | X | X | X | X | X | 1 | 0 | 1 | OTHER INFO. - POS. X-DIRECTION |
| X | X | X | X | X | X | 0 | 0 | 1 | OTHER INFO. - NEG. X-DIRECTION |
| X | X | X | X | X | X | 1 | 1 | 1 | OTHER INFO. - POS. Y-DIRECTION |
| X | X | X | X | X | X | 0 | 1 | 1 | OTHER INFO. - NEG. Y-DIRECTION |
$A_8$ $A_7$ $A_6$ $A_5$ $A_4$ $A_3$ $A_2$ $A_1$ $A_0$
Fig. 5

SYSTEM FOR TRANSMITTING POSITION INFORMATION

This is a continuation of application Ser. No. 484,958, filed July 1, 1974, now abandoned.

This invention relates to a method and apparatus for transmitting position information to a body or bodies operating within a defined zone, and the invention is more particularly concerned with a method and apparatus for emitting radiant energy in such a manner that the energy emissions define a plurality of identified lines of position and that the particular line of position occupied by a body which is remote from the point of emission and which can detect the emissions can be ascertained at the body simultaneously with other data being transmitted to it.

Systems of the general type to which the present invention relates are disclosed in U.S. Pat. Nos. 3,159,837 and 3,398,918 and in Swedish patent applications Nos. 7650/67 and 10,723/67. In general such a system has utility for the guidance and control of missiles and unmanned vehicles, for the scoring of certain types of target practice with both real and simulated missiles, and for the guidance and control of aircraft, especially in landing approaches.

The above mentioned references discuss some of the problems posed by a system of the type here under consideration and the characteristics and features that are desirable in such a system. To be suitable for its purpose, a system for the transmission of position information must have good resolution in the sense that positions defined by the system should be clearly and unambiguously ascertainable within small limits of error; the system should be insensitive to disturbances and faults in transmission; and it should have optimum range considering the medium and means employed.

A good position information system should have a degree of resolution that is suitable to the application for which it is intended; that is, it should afford to the body or bodies guided by it an accuracy of guidance that is consistent with their nature and mission. In general, however, the higher the resolution, the better the system. Thus, by way of example, a coordinate system should have defined and discrete unit squares which are as small as possible.

In most prior position information systems, as in the one of this invention, position information is transmitted by means of a beam of radiant energy originating from a more or less point source and directed in an angular scanning sweep across a zone in which control or guidance is to be exercised. If the rate of beam sweep is slow, control or guidance will tend to be inaccurate because of the lack of information during the intervals between successive interceptions of the beam by the body being controlled or guided. On the other hand, if the beam is modulated or pulsed to encode position information in it, then a rapid rate of beam sweep can be permitted only if the coded information can be detected and decoded during the short time that the beam is intercepted by the body. In prior systems, a rapid rate of beam sweep was inherently in conflict with the requirement for good resolution, inasmuch as such systems employed pulse codes that required numerous pulses to denote each defined angular position of the beam, or required reference beams.

Particularly where the radiant energy beam is a light beam, such as a laser emission, it is essential that the system be one that is inherently insensitive to disturbances, in view of the fact that the detector means in the body being controlled or guided is capable of responding to light from other sources than the beam emitter. Thus the movement of the body can cause changes in the value of the existing background radiation, which changes may be sensed by the radiation detector as a modulation or disturbance of the guiding beam. In missile firings, for example, the background radiation that reaches a detector on the missile is strongly modulated by missile flames and smoke, by atmospheric turbulence and by solar radiation filtered and reflected by trees, vegetation, structures and the like. In known systems using frequency modulation and pulse width modulation of the beam for encoding position information, it can be easily shown that with regard to the rate of movement of a missile and the range of a radiation receiver, disturbance modulation is particularly strong in the frequency range which has been proposed for such types of modulation. To avoid the effects of disturbance modulation, the transmission of position information must utilize frequencies in the mega-Hertz range.

To obtain optimum range, the guiding beam or beams of the system must be narrow, so that the whole of the effect available from the radiation emitter is cncentrated and thus maintains high intensity even at a substantial distance from the emitter. Because of the sensitivity characteristics of known detectors that are responsive to laser radiaiton (e.g., silicon detectors) it is disadvantageous from the standpoint of range to utilize the mean power available from a laser emitter by causing it to emit a succession of long pulses separated by sort intervals. Moreover, the effect of disturbances resulting from background radiation is great in such a transmission scheme.

In general, it is an object of the present invention to provide a system for the transmission of positon information which possesses to a high degree all of the above discussed desirable characteristics, namely good resolution, insensitivity to disturbances and transmission faults, and optimum range with regard to the medium and means employed for transmission of position information.

Another general object of this invention is to provide a method and apparatus for transmitting an item of information at each of a succession of different angular positions of a sweeping beam of the character described, whereby each such item of information can include two or more kinds of data, such as beam angle data and beam identification data, and whereby each item of information is encoded in an interval between successive pulses of the beam and can be readily decoded at a receiving body.

Another and more specific object of this invention is to provide a position information transmitting system which is capable of defining with high resolution and with the use of a minimum of laser pulses a line of position or a coordinate position in space, and which system has substantial inherent immunity to disturbances due to radiation from sources other than the laser that emits such pulses.

Further objects of the invention are to provide a position information system of the character described wherein position information can be transmitted by means of relatively short pulses of radiant energy from a laser or the like, which pulses can be — but need not be — of uniform duration; wherein information encoded in the radiant energy emissions can comprise position information along with other information, with a plurality of types of data being transmitted as a single item of information; and wherein all such coded information can be decoded by means of relatively simple apparatus carried in a body to be guided or controlled by means of such emissions.

With these observations and objectives in mind, the manner in which the invention achieves its purpose will be appreciated from the following description and the accompanying drawings which exemplify the invention, it being understood that changes may be made in the precise method of practicing the invention and in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which:

FIG. 4 illustrates the rates of scanning sweep of the two scanning beams in their relation to one another;

FIG. 5 illustrates an example of binary words built up for encoding in emissions of radiant energy and reconstructed from detected emissions of radiant energy; and FIG. 6 illustrates diagrammatically how a binary word is transmitted as an interval between the beginnings of successive emission pulses.

Figure 1:
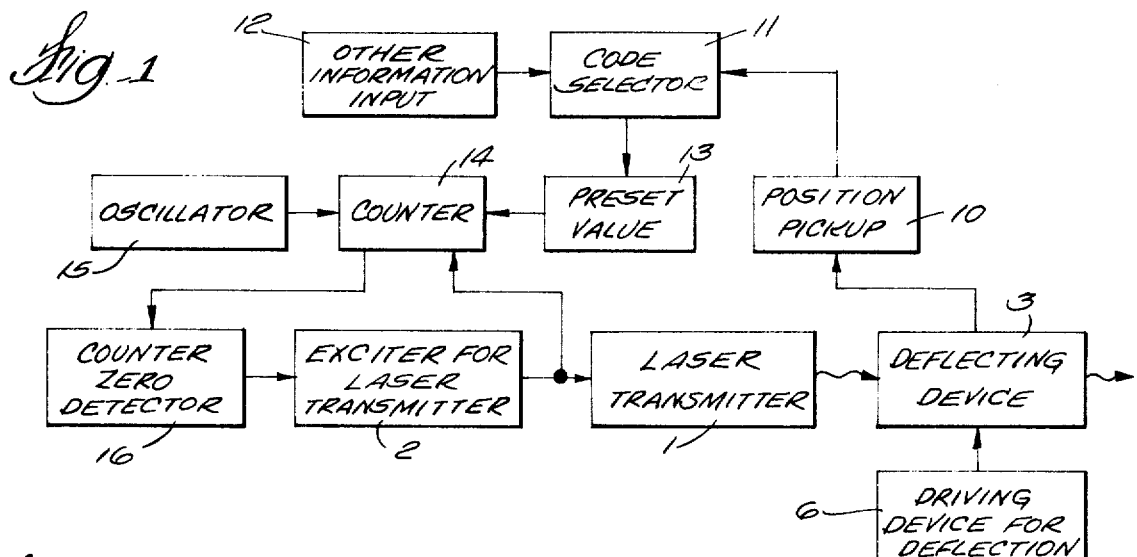
FIG. 1 is a block diagram of the transmitting apparatus of a position information system that embodies the principles of the present invention.
Figure 2:
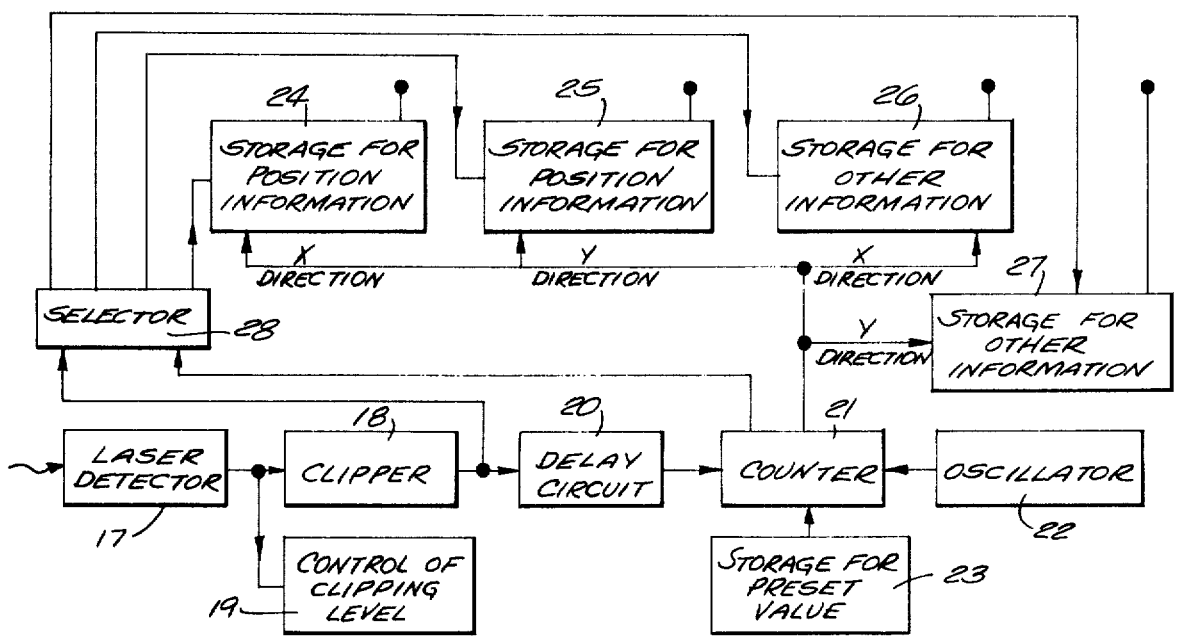
FIG. 2 is a block diagram of a receiver for a system of this invention.

Referring now to the accompanying drawings, apparatus embodying the principles of the present invention comprises, in general, transmitting equipment, illustrated in FIG. 1 and which may be situated at a fixed station on the earth's surface, and receiving equipment illustrated in FIG. 2 and which may be carried by a moving body such as a missile or an aircraft. The transmitting equipment comprises a device which emits radiant energy in a beam that has very little divergence in one direction transverse to its direction of radiation, and the transmitting apparatus is therefore illustrated as comprising a laser transmitter 1.

Figure 3:
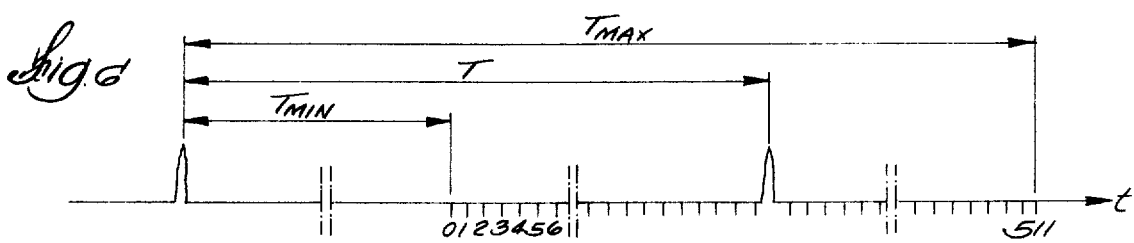
FIGS. 3A and 3B are diagrams which together illustrate the scanning of a pyramid-shaped zone by a pair of coordinated fan-shaped scanning beams, both of which can emanate from the same source and which move at right angles to one another.

According to the present invention, radiant energy is emitted from the transmitting equipment in pulses, and, as explained hereinafter, information is encoded in the emissions by controlling the intervals between the beginnings of successive pulses in accordance with a predetermined code. Since the information is conveyed in the time interval that elapses between the beginning of one pulsed emission and the beginning of the next succeeding pulsed emission, the duration of any particular pulse is not in itself critical, so long as it terminates sufficiently before the beginning of the next succeeding pulse so that said beginning is well defined. It follows that all pulses of emitted energy can be of uniform duration, and in fact it is preferable that the pulses be of uniform duration, with the intervals between pulses being varied; but it will be apparent that pulse duration could be permitted to vary within the limits of the constraint just mentioned. It will also be apparent that each pulse of emitted radiation can be of relatively short duration, with relatively long intervals between successive pulses, to take advantage of optimum conditions for emission and detection of laser radiation, Before proceeding to a further explanation of the manner in which information is encoded in the radiant energy emissions, attention should be directed to the manner in which the emitted energy is directed into space. In a preferred embodiment of the invention, the transmitting apparatus emits its position information into a pyramid-shaped zone from a location at the apex of the pyramid. In FIGS. 3A and 3B, the transmitter 1 can be assumed to be located on the earth's surface and to be emitting its radiations towards an imaginary vertical plane 7 which is located at a distance from the transmitting equipment and which can be regarded as the base of the pyramid. In the illustrated case, the transmitter is arranged to emit two pulsing fan-shaped beams 4 and 5. It emits these beams alternately, and each beam is caused to make a scanning sweep completely across the pyramid-shaped zone before the other beam is emitted and makes its sweep.

More specifically, the azimuth beam 4, which makes its scanning sweeps in the x directions (that is, horizontally, or in azimuth) has very little divergence in the x directions but has such vertical divergence as to have a characteristic fan shape whereby a complete sweep of that beam defines the pyramid-shaped zone. In like manner the elevation beam 5, which makes its scanning sweeps in the y (elevation) directions, has little divergence in the directions of its sweep but has such horizontal divergence as to extend exactly across the sweep of the beam 4; and, in turn, the elevation beam makes its sweeps across the zone defined by the major divergence and sweep of the azimuth beam 4.

As illustrated in FIG. 4, each of the beams 4 and 5 makes its sweeps at a sinusoidally varying rate, with a phase difference of 90° between the two beams. The thickened lines 8 in FIG. 4 denote the scanning sweeps of the azimuth beam 4, while the thickened lines 9 denote those of the elevation beam 5. Note that the beam 4 makes a sweep in one azimuth direction, and at the completion thereof the beam 5 makes a sweep in one elevation direction; than the beam 4 makes a sweep in the other azimuth direction, followed immediately by the beam 5 making a sweep in the other elevation direction.

Because each beam is pulsed during its sweep, and makes each sweep at a predetermined rate, the beam of course has a certain instantaneous angular positon of sweep at the beginning of each pulse. Information about that position is encoded, as more fully explained below, in terms of a time interval to the beginning of the next succeeding pulse. It will be apparent that a body in the zone swept by the beams, in order to acquire and decode the information contained in the pulses of a beam, must intercept that beam during at least two successive pulses of it. This means that the pulse rate and the rate of sweep of each beam must be so coordinated with one another and with the normally expectable rate of motion of a body in the zone as to insure that the body can acquire at least two successive pulses of each beam.

Each pair of successive pulses of a single beam thus contains encoded information about a line of position that is defined by the beam and extends along it. More accurately, in view of the fan-like divergence of the beam, the beam might be said to define a plane of position. Since the two beams of the present example have their orientations and sweeps mutually perpendicular to one another, they cooperate to define a grid of intersecting planes of position, and each location on that grid is identified as to its coordinates by the information encoded in the two beams as their sweeps pass that location.

Returning now to FIG. 1 for a more detailed consideration of the transmitting apparatus, the two beams 4 and 5 can emanate from a single laser emitter 1, cooperating with a periodically operating angle-turning prism which defines the respective beams at the proper times; or two radiation sources can be used that tend to emit parallel beams. A pair of diode lasers can suitably be used, inasmuch as the light emitting surface of a diode laser has a high aspect ratio. It will be understood that the laser apparatus cooperates with suitable optical means (not shown) that effects the necessary fan-shaped divergence of the beam.

A deflecting device 3, operating under the control of a driving device 6, also cooperates with the laser apparatus and the optical means to produce the above described scanning sweep of the beams. The deflecting device may comprise so called diasporameters, consisting of a pair of optical wedges arranged in contrarotating relationship to one another.

Coupled to the deflecting device is a position pickup 10. At the beginning of each pulse of each beam the position pickup 10 cooperates with a code selector 11 to which it is connected to issue a binary digital output which is in effect a code number that identifies the instantaneous angular position of the beam sweep at that time. Each of the different numbers thus formed is unique and invariable for a particular position of sweep. Furthermore, each such number, as more particularly explained hereinafter, encodes certain address information that includes identification of the particular beam - azimuth or elevaton - which is making the sweep. Thus the output of the code selector 11 is a digital output, constituting a binary word having a numerical value which is unique not only to the particular instantaneous position of the beam but also to the combination of that instantaneous positon with the particular address information encoded in the binary word.

Instead of positon information, the information to be encoded in the transmission may constitute "other informaton," as described below. Each such piece of "other information" is likewise initially encoded in a unique binary word. The "other information" to be transmitted is available in binary coded form from an "other information" input device 12, and the code selector 11 serves to determine whether position information of "other information" is to be transmitted at any particular time.

The transmitting apparatus also comprises a stable clock oscillator 15 which issues pulses at a fixed predetermined frequency. The pulses of the oscillator 15 thus define brief time units. In general, the binary word that encodes the instantaneous position information or "other information" denotes the number of such time units that are to elapse between the instant at which the binary word output was selected at the beginning of a beam pulse, and the beginning of the next succeeding beam pulse.

The nature of a suitable code for conveying position information and "other information" in terms of the duration of the interval between the beginnings of successive beam pulses is most readily understood by considering it from the standpoint of binary words employed in those parts of the transmitting equipment which are responsible for controlling the duration of that interval. A form of binary code suitable for the purpose is shown in FIG. 5, which illustrates a code utilizing nine bits for each binary word. Each bit is of course either a binary "zero" or a binary "one," and hence the various combinations ad permutations of nine bits provide for the formation of 512 different binary words. In the figure, the several bits are respectively designated $A_8 \ldots A_0$, of which $A_8$ is the most significant bit and $A_0$ is the least significant bit. The first six bits of each binary word, designated in the figure by $A_8 \ldots A_3$, denote either substantive position information or substantive "other information"; and since any particular one of those bits may be either a binary zero or a binary one, depending upon the sweep position to be signified, such bits are indicated by X's in the figure. Of the three least significant bits of each binary word, that designated by $A_2$ is a symbol bit denoting the direction of sweep (e.g., "one" denotes azimuth sweep to the right or elevation sweep upward, and "zero" denotes azimuth sweep to the left or elevation sweep downward), while the two least significant bits, designated by $A_1$ and $A_0$, contain address information denoting the beam (azimuth or elevation) and whether the substantive information is position information or "other information."

The code selector releases the selected binary word into a presettable counter 14 through a preset value device 13. In effect, the present value device adds a constant to the number denoted by the binary word, for a reason to be explained hereinafter; and the output of the preset value device, which is released into the counter 14, thus has a numerical value corresponding to the selected binary word plus that constant. Immediately upon being thus preset, the counter, through its counting input, begins to receive pulses from the clock oscillator 15, and by such clock pulse inputs the counter has its contents counted down to zero.

A detector 16 is connected with the counter 14 to detect the zero condition of the latter and to issue an output to an exciter 2 for the laser transmitter as soon as the content of the counter goes to zero. The laser is thus caused to begin the emission of another pulse of radiation, and at the same time the position pickup detects the new instantaneous position of sweep of the beam and initiates a new output cycle in which the counter is preset to a different number, appropriate to that positon of sweep, and is again counted down to zero.

FIG. 6 illustrates the time relationship between the beginnings of successive laser pulses. The minimum time interval between the beginnings of successive pulses, which is determined by the maximum permissible pulse frequency of the laser beam generating source for the transmitter 1, is designated by $T_{min}$. Thus $T_{min}$ is an irreduceable minimum time interval between the beginnings of successive radiation pulses; and since it is a constant, it cannot in itself signify any information. The duration of each radiation pulse will of course be somewhat less than $T_{min}$. To the extent that the interval between successive pulses is greater than $T_{min}$, information is conveyed. An actual time interval between the beginnings of successive pulses is denoted by T. The time difference between T and $T_{min}$, measured in the time units defined by the clock oscillator 15, corresponds to the number denoted by the binary word issued by the code selector 11 and can thus signify the instantaneous angular position of the beam sweep at the beginning of the interval designated by T. The maximum value $T_{max}$ that T can have, in the illustrated example, is $T_{min}$ plus 512 of the oscillator pulse time units.

It will now be apparent that the constant value which is added to the binary word output of the code selector 11 by the preset value device 13 corresponds to $T_{min}$. It will also be apparent that the non-constant portion of each interval T (i.e., the difference between T and $T_{min}$) varies stepwise as between the significations for any one defined sweep position and any other defined sweep position, being always a whole multiple of the time unit defined by the clock oscillator 15. Because of this stepwise variation — as distinguished from a continuous one — the system of this invention can readily discriminate against disturbance pulses, and the receiving apparatus can sharply distinguish between all of the different possible information transmissions.

Before going on to a consideration of the receiver apparatus, it might be noted that in the foregoing explanation it has been said that the position information conveyed in terms of a time interval between the beginnings of two successive radiation pulses denotes the instantaneous position of the sweep at the beginning of that interval. This is true in the sense that the position of sweep at the beginning of the interval is picked off for the purpose of initiating the interval. But obviously the code in which the information is conveyed is a pre-established one, and the instantaneous position that the sweep will occupy at the end of any such interval is also known at the beginning of the interval. Hence the apparatus can be arranged to present the detected and decoded information in terms of the instantaneous position of beam sweep at the end of the interval, so that strictly current position information is available at the body being controlled or guided.

In the receiving apparatus the delay intervals between the beginnings of successive radiation pulses are reconstructed into binary words. The receiving apparatus comprises a detector 17 which issues an output in response to its receipt of a radiation emission from the transmitter 1. That output is fed through a clipper 18, under the control of a clipping level control device 19. The detector 17 and the clipper 18 cooperate to pass only the leading edge of each radiation pulse; and they likewise cooperate to discriminate against radiation from sources other than the transmitter 1 inasmuch as only a strong pulse signal falling upon the detector can result in the issuance of an output from the clipper 18. The last mentioned output is in the form of a brief pulse signal which is issued to a delay circuit 20, and also to a selector 28, the purpose of which is described below.

The delay circuit 20, after a predetermined constant delay interval following receipt of an input from the clipper, issues an output that opens a counter 21 to a presetting input from a preset value storage 23 and to counting inputs from a clock oscillator 22. The presetting value fed into the counter 21 from the preset value storage device 23 corresponds to a function of $T_{min}$ and of the delay interval of the delay circuit 20. Preferably the frequency of the clock oscillator 22 is a whole-number multiple of the frequency of the transmitter clock oscillator 15, so that the receiver clock oscillator issues a plurality of pulses during each time unit defined by the transmitter clock oscillator 15. By reason of this relationship between the frequencies of the two oscillators, there is a reduced interval between the detection of an incoming laser pulse and the beginning of counting by the counter 21, as compared with the situation that would exist with a one-to-one ratio between oscillator frequencies; and, in addition, there is a reduced likelihood of faults and errors in reception.

Because the frequency of the oscillator 22 is a fixed multiple of the frequency of oscillator 15, the count held by the counter 21 at the end of the counting interval would be higher than the number of time units defined by the oscillator 15 for the same interval, but would in principle be in a fixed ratio to that number of time units. In fact, however, the oscillators 15 and 22 are independent of one another and therefore are not necessarily in synchronism with one another. Consequently, during each counting interval the oscillator 22 can issue one or a few pulses that are outside the exact limits of the time units defined by the oscillator 15. Such pulses can be readily sorted out by a gating process controlled by the oscillator 22. Since the cancelled pulses would be the least significant bits of the number counted by the counter 21, the effect of any transmission interference or disturbance is reduced by the described frequency relationship between the oscillators.

As mentioned above, an output for the leading edge of each received laser pulse is fed by the clipper 18 into the selector 28 as well as to the delay circuit 20. In response to such an incoming pulse signal, the selector 28 activates one of four storage circuits, namely a storage 24 for azimuth position information, a storage 25 for elevation position information, a storage 26 for "other information" related to azimuth, and a storage 27 for "other information" related to elevation. The particular storage to be activated depends upon the condition of the counter 21 at the instant when the output of the clipper 18 is delivered to the selector 28, inasmuch as the content of that counter constitutes a binary word that denotes the number of time units in the laser pulse interval T, and hence corresponds to the binary word issued by the code selector 11 in the transmitting apparatus. The least significant digits of that binary word, as explained above, constitute an address which designates one of the storages, and to that storage is transferred the substantive information comprising the remainder of that binary word. The delay interposed by the delay circuit 20 affords time for this transfer to be carried out. At the conclusion of the delay interval, the delay circuit effects a new presetting of the counter and initiates a new cycle of its counting, and the process is repeated.

The position information stored in the position storages 24 and 25 is utilized in a manner that will be readily understood by those skilled in the art in a computer device (not shown), which may calculate guiding signals for control of the body; or if the body is a manned device such as an aircraft, the stored position information may be fed to suitable readout or display means.

As pointed out above, rate of beam sweep and the pulse rate of the beam must be so coordinated with one another and with the expectable speed of the body to be controlled or guided that at least two successive radiation pulses are detectable at the body during each beam sweep. Preferably, however, at least three such successive pulses should be so detectable, to enable the body to acquire two successive sets of position information, from which a digital average can be taken. In this way the effects of atmospheric refraction phenomena can be reduced.

The term "other information" as used hereinabove refers to information that has no direct relationship to the instantaneous position of the guiding beam during the course of its sweep. In the case of a missile guidance application, for example, such "other information" signals may be used for arming or for proximity fuse safetying, so that it is possible to remotely control such devices with very low risk of explosions that might harm the controlling personnel. Also of interest in the application of the invention to missile guidance is the possibility of using "other information" signals to compensate for any departure of the missile at high angular velocities or angular acceleration from a previously established guided direction, as a result of movement of the target. In a system in accordance with the present invention, contrary to what is possible with prior systems, such compensation can be carried out entirely by electronic means.

In applying the principles of this invention to a landing system for aircraft, the transmission of "other information" can be used for automatic control functions of various types. The address portion of each transmission makes it easy to distinguish between position information and "other information" and makes it possible to provide that certain types of "other information" shall be valid only in connection with certain position information.

The principles of the invention can also be applied to setups for gunnery target practice firing with the use of laser pulses instead of real missiles. In transmitting position information, the instantaneous position of beam sweep can be related to the boresight axis of a weapon, so that information is acquired at the target concerning its position in relation to that axis. In such cases, "other information" can comprise a designation of the type of ammunition or missile assumed to be fired at the target, so that a calculation can be made at the target location, on the basis of the transmitted information, which signifies the extent of damage, if any, that would have been inflicted upon the target by the corresponding firing of a real round.

The present value device 13 can be employed to modify a binary word fed to the counter 14 when such a binary word encodes position information. It can do this to provide for an electronic transfer of the center of the coordinate system defined by the beams in their sweeps, such as might be required, for example, in order to compensate for an alignment disturbance in a gyrostatically stabilized sighting system.

From the foregoing description taken with the accompanying drawings it will be apparent that this invention provides a method and apparatus for transmitting position information with the use of sweeping pulsed beams of radiant energy, emitted from a laser or the like, which system provides a high degree of resolution, is insensitive to disturbances and faults in transmission, and has optimum range considering the medium and means employed.

Those skilled in the art will appreciate that the invention can be embodied in forms other than as herein disclosed for purposes of illustration.

The invention is defined by the following claims:

I claim:

1. A method by which numerous different predetermined items of information can be transmitted one by one towards a moving body from a relatively fixed radiation emitter that emits pulses of radiant energy in a fan-shaped beam and sweeps angularly in a direction flatwise of the beam, each such item of information being transmitted in a different and predetermined portion of the sweep and the beam being narrow in the direction of sweep so that the body can receive only such of the transmitted items of information as are appropriate to its position at the time the beam intercepts it, but the width of the beam and the rate of sweep being so related to the expected speed of the body that at least two radiant energy pulses are detectable at the body during each sweep, said method enabling each such transmitted item of information to comprise a plurality of kinds of data, as for example sweep angle data and beam identification data, said method being characterized by:

A. assigning to each item of information to be transmitted a whole number which is unique to that item of information;

B. at the radiation emitter generating encoding clock pulses at a regular rate;

C. by counting encoding clock pulses beginning at the end of an invariant non-characterizing time period following each emission of a radiant energy pulse, so controlling the time interval between said emission and the next succeeding emission of a radiant energy pulse that said time interval is equal to 1. said non-characterizing time period 2. plus a characterizing time period which is measurable in a whole number of consecutive time units of a constantly uniform short duration, each of said time units being defined by the generation of a whole number of encoding clock pulses and the number of said time units in said characterizing time period being equal to the whole number assigned to an item of information to be transmitted during said time interval;

D. at the body, generating decoding clock pulses at a regular rate which is so related to said rate at which said encoding clock pulses are generated that an integral number of decoding clock pulses are issued during each of said time units; and E. beginning after said non-characterizing time period following reception at the body of an emitted radiant energy pulse, counting decoding clock pulses generated until the next radiant energy pulse is received, to enable decoding of the item of information signified by the time elapsed between two successively received radiant energy pulses.

2. A method of conveying to a moving body one of a plurality of different predetermined items of information encoded in pulses of radiant energy emitted in a fan-shaped beam from a relatively fixed radiation emitter that sweeps angularly in the flatwise direction of the beam, wherein a succession of different items of information are transmitted one by one during the course of each sweep and each such item of information is transmitted in a predetermined portion of the sweep, said beam being narrow in the direction of sweep so that the particular item of information conveyed to the body when the beam intercepts it is one that is appropriate to the position of the body at the time of such interception, but the thickness of the beam and the rate of sweep being so related to the expectable speed of the body that at least two successive radiant energy pulses are detectable at the body during each sweep, said method enabling each such transmitted item of information to comprise a plurality of kinds of data, as for example sweep angle data and beam identification data, said method being characterized by:
  A. for each item of information to be transmitted, storing at the radiation emitter and at the body an assigned binary number which is unique to that item of information,
    1. every such assigned binary number having the same number of bits as every other one, and
    2. bits of like significance of every such binary number always being assigned to data of like kind;
  B. at the radiation emitter generating encoding clock pulses at a regular rate;
  C. by counting generated encoding clock pulses, so controlling the time interval between each radiant energy pulse and the next succeeding radiant energy pulse that said time interval has a characterizing portion
    1. which is measurable in a whole number of constantly uniform short time units, each of which has a duration equal to a whole number of encoding clock pulses, and
    2. the number of such time units in said characterizing portion of said interval is equal to the numerical value signified by the binary number assigned to an item of information to be transmitted during the portion of the sweep in which said radiant energy pulses are produced;
  D. at the body, producing decoding clock pulses at a regular rate so related to the rate at which said encoding clock pulse are produced that an integral number of decoding clock pulses is produced during each of said short duration time units; and
  E. upon detection of a radiant energy pulse at the body, and during the characterizing portion of the time interval between detection of that radiant energy pulse and the detection of the next succeeding radiant energy pulse, feeding decoding clock pulses to a binary counting device to generate therein a binary number that can be compared with the stored binary numbers to signify the conveyed item of information.

3. A method by which numerous different predetermined items of information can be transmitted one by one towards a moving body from a relatively fixed radiation emitter that emits pulses of radiant energy in a fan-shaped beam and sweeps angularly in a direction flatwise of the beam, each such item of information being transmitted in a different and predetermined portion of the sweep and the beam being narrow in the direction of sweep so that the body can receive only such of the transmitted items of information as are appropriate to its position at the time the beam intercepts it, but the width of the beam and the rate of sweep being so related to the expected speed of the body that at least two radiant energy pulses are detectable at the body during each sweep, said method enabling each such transmitted item of information to comprise a plurality of kinds of data, as for example sweep angle data and beam identification data, said method being characterized by:
  A. storing at the radiation emitter and at the body a plurality of different values, each uniquely signifying a predetermined one of said items of information and each corresponding to a duration for one of a like plurality of different time intervals,
    1. the beginning and end of each such time interval being definable by two successive radiant energy pulses emitted from the emitter, and
    2. each such time interval differing in duration from every other one of said time intervals by an integral multiple of a short time unit having a predetermined constant duration;
  B. at the radiation emitter generating encoding clock pulses at a regular rate such as to produce a whole number of encoding clock pulses during each of said time units;
  C. by counting encoding clock pulses, so controlling the elapsed time between successive pulses of radiant energy emitted in each portion of the sweep of the beam that said elapsed time corresponds to the one of said stored values that signifies the item of information to be transmitted in said portion of the sweep of the beam;
  D. at the body generating decoding clock pulses at a regular rate which is so related to the rate at which said encoding pulses are produced that an integral number of decoding clock pulses is produced during each of said time units; and
  E. at the body, during the interval between successive detected radiation pulses, counting decoding pulses so that the transmitted item of information can be ascertained by comparison with said stored values.

* * * * *